Patented Oct. 29, 1940

2,220,019

UNITED STATES PATENT OFFICE 2,220,019

REFRACTORY AND METHOD OF MANUFACTURE

John D. Morgan, South Orange, N. J., assignor to Power Patents Company, Hillside, N. J., a corporation of Maine No Drawing. Application February 11, 1939, Serial No. 255,932

5 Claims. (Cl. 106—9)

The present invention relates to bonded refractories and more particularly to zirconium refractories.

Zirconia and zircon are the better known zirconium minerals employed in producing bonded refractories. Refractories of zirconia and zircon are highly resistant to elevated temperatures and to thermal shock. However, both zircon and zirconia refractories often exhibit the drawback of a certain amount of volume shrinkage while they are being fired. Moreover fired zircon and zirconia refractory crucibles and similar articles often have an undesirable degree of porosity, apparently due to their somewhat porous crystalline structure.

A particular object of the present invention is to provide a bonded zirconium compound refractory which is substantially impenetrable by molten metals and slags and is therefore adapted for crucibles and similar articles.

With the above and other objects in view, the invention consists in the improved bonded zirconium mineral refractory and method of making same which is hereinafter described and more particularly defined by the accompanying claims.

Dense and substantially impenetrable articles can be made from granular zircon by heating the zircon grains to a fusion temperature of about 4000° F. However, no practicable way has been found for casting impenetrable articles from slips of granular zircon bonded with phosphoric acid, clay, or other previously used bonding agents.

The present invention is based on the discovery that slips of granular zircon containing as little as 1%–2% by weight of a fibrous asbestos mineral such as chrysotile, anthophyllite and amphibole as a bonding agent, can be cast or molded and fired at temperatures as low as 2400–2600° F. to produce crucibles and other articles of such density as to resist penetration of molten metal and even of molten cryolite. Apparently these asbestos minerals have the property of reacting chemically with or otherwise modifying the normally crystalline structure of the unfused zircon, so as to produce a vitreous or amorphous impenetrable article at temperatures far below the fusion temperature of the zircon itself.

For example a refractory slip suitable for casting crucibles and the like can be prepared by adding to a batch of milled grain (thru 300 mesh) zircon about 1%–2% by weight of chrysotile or other fibrous asbestos mineral, and agitating the mixture in a ball mill or other suitable mixing apparatus until a thorough blend is obtained. The blended mixture is then wetted with water to a fluid consistency and the resulting slips may be poured directly in a casting mold and heated to a firing temperature of about 2600° F. Zirconia and other zirconium minerals may be used in place of zircon. A mixture of about equal parts of zircon and zirconia yields a particularly satisfactory product.

The foregoing preferred procedure may be varied by adding to the zircon-chrysotile mixture a low temperature hardening bonding agent, such as about 2% concentrated sulphite waste liquor (lignin) or a mixture of 6% phosphoric acid and 2% chromic acid, then molding or casting the wet material and baking at a temperature of about 600° F. The resulting baked cast article can be then removed from the mold and fired to a temperature of about 2600° F.

After firing, the crucible or other cast or molded article has low shrinkage characteristics (0.3% or under) and has a dense amorphous structure closely resembling that of fused zircon. A crucible made of this refractory is chemically inert to molten metal and slags and will hold molten cryolite at a temperature of 2350° F. without any apparent penetration.

The invention having been thus described, what is claimed as new is:

1. A refractory product comprising the high temperature reaction product of a zirconium mineral and 1%–2% by weight of an asbestos mineral.

2. A refractory product comprising the high temperature reaction product of zircon and 1%–2% by weight of chrysotile.

3. A refractory product comprising the high temperature reaction product of zircon and 1%–2% by weight of amphibole.

4. A method of bonding zirconium oxide and silicate particles to form a refractory body having extremely low penetration for molten metal and slags comprising heating such particles admixed with 1%–2% by weight of asbestos mineral to a temperature of 2400–2800° F.

5. A method of bonding a batch of milled grain zircon particles to form a refractory body having an extremely low degree of porosity comprising heating said batch admixed with 1%–2% by weight of a chrysotile to a temperature of approximately 2600° F.

JOHN D. MORGAN.